(12) United States Patent
Kubota

(10) Patent No.: US 11,303,867 B2
(45) Date of Patent: Apr. 12, 2022

(54) METHOD OF CONTROLLING DISPLAY SYSTEM, DISPLAY SYSTEM, AND METHOD OF CONTROLLING PROJECTOR

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/323,574

(22) Filed: May 18, 2021

(65) Prior Publication Data

US 2021/0368150 A1 Nov. 25, 2021

(30) Foreign Application Priority Data

May 19, 2020 (JP) .............................. JP2020-087514

(51) Int. Cl.
*H04N 9/31* (2006.01)

(52) U.S. Cl.
CPC ......... *H04N 9/3194* (2013.01); *H04N 9/3182* (2013.01)

(58) Field of Classification Search
CPC .......................... H04N 9/3194; H04N 9/3182
See application file for complete search history.

(56) References Cited

U.S. PATENT DOCUMENTS

| 8,550,635 | B2* | 10/2013 | Kotani | H04N 9/3194 353/94 |
| 8,979,277 | B2* | 3/2015 | Pines | G03B 21/008 353/85 |
| 9,030,485 | B2* | 5/2015 | Cho | H04N 9/3194 345/602 |
| 9,134,597 | B2* | 9/2015 | Mizuno | G03B 21/206 |
| 9,398,277 | B2* | 7/2016 | Ikeda | H04N 9/3185 |
| 9,494,847 | B2* | 11/2016 | Katahira | G03B 21/142 |
| 9,769,441 | B2* | 9/2017 | Hsiao | H04N 9/3179 |
| 9,794,450 | B2* | 10/2017 | Kobiki | H04N 9/3194 |
| 9,832,393 | B2* | 11/2017 | Kobiki | H04N 5/2628 |
| 9,843,781 | B1* | 12/2017 | Furui | G06T 7/70 |
| 10,218,949 | B2* | 2/2019 | Naganuma | H04N 9/31 |

(Continued)

FOREIGN PATENT DOCUMENTS

| JP | 2001-83949 A | 3/2001 |
| JP | 2005-099150 A | 4/2005 |
| JP | 2015-060012 A | 3/2015 |

*Primary Examiner* — Brian P Yenke
(74) *Attorney, Agent, or Firm* — Oliff PLC

(57) ABSTRACT

A method of controlling a display system includes a first generation step of projecting a test pattern in a reference state in which a projection condition of a first projector is adjusted so that a color of a first projection image when viewed from the front becomes a desired color, and taking the first projection image corresponding to the test pattern by a first camera to generate a first reference image, a second generation step of projecting the test pattern and then taking the projection image corresponding to the test pattern by the first camera to generate a first comparative image, a third generation step of generating first correction data for correcting the projection condition so that the first comparative image coincides with the first reference image, and a correction step of correcting the projection condition based on the first correction data.

9 Claims, 10 Drawing Sheets

(56) References Cited

U.S. PATENT DOCUMENTS

| | | | | |
|---|---|---|---|---|
| 10,481,472 B2* | 11/2019 | Geng | .................... | G03B 21/142 |
| 10,630,948 B2* | 4/2020 | Post | .................... | H04N 9/3182 |
| 10,681,317 B2* | 6/2020 | Nordback | ................. | G06T 7/90 |
| 10,873,731 B2* | 12/2020 | Mano | .................... | H04N 17/00 |
| 11,153,544 B2* | 10/2021 | Han | .................... | H04N 9/3194 |
| 2008/0036976 A1* | 2/2008 | Han | .................... | H04N 9/3194 |
| | | | | 353/69 |
| 2015/0077584 A1 | 3/2015 | Kunieda et al. | | |
| 2021/0029332 A1* | 1/2021 | Hsiao | .................... | H04N 9/3182 |
| 2021/0076013 A1* | 3/2021 | Mano | .................... | H04N 9/3194 |
| 2021/0136338 A1* | 5/2021 | Kashiwagi | ........... | H04N 9/3197 |
| 2021/0136339 A1* | 5/2021 | Kashiwagi | ........... | H04N 9/3185 |
| 2021/0168341 A1* | 6/2021 | Kubota | ................ | H04N 9/3179 |
| 2021/0195152 A1* | 6/2021 | Oike | .................... | H04N 9/3182 |
| 2021/0368146 A1* | 11/2021 | Lee | .................... | H04N 9/3194 |

* cited by examiner

# METHOD OF CONTROLLING DISPLAY SYSTEM, DISPLAY SYSTEM, AND METHOD OF CONTROLLING PROJECTOR

The present application is based on, and claims priority from JP Application Serial Number 2020-087514, filed May 19, 2020, the disclosure of which is hereby incorporated by reference herein in its entirety.

BACKGROUND

1. Technical Field

The present disclosure relates to a method of controlling a display system, a display system, and a method of controlling a projector.

2. Related Art

There are known a variety of technologies for adjusting a projection image by a projector based on a taken image by a camera.

For example, in JP-A-2005-99150 (Document 1), there is described the fact that unevenness or the like caused by a luminance variation between the periphery and the center of a screen is corrected using a plurality of cameras.

However, in the projector described in Document 1, it is possible to perform an adjustment while placing the cameras at positions right in front of the screen when performing an initial adjustment, but after completing the initial adjustment, a chair, a table, or the like is disposed at the position in front of the screen, and it is difficult to place the cameras at the positions right in front of the screen in some cases. In such cases, when performing a readjustment, the adjustment is performed while disposing the cameras at other positions than the positions right in front of the screen, but it is difficult to perform the adjustment since the projection light projected on the screen varies in color in accordance with an observation angle.

SUMMARY

An aspect for solving the problem described above is directed to a method of controlling a display system including a first generation step of projecting a test pattern by a first projector in a reference state in which a projection condition of the first projector is adjusted so that a color of the first projection image when viewed from front becomes a desired color, and taking a first projection image corresponding to the test pattern by a first camera to generate a reference image, a second generation step of projecting the test pattern by the first projector and taking the first projection image corresponding to the test pattern by the first camera to generate a comparative image when performing a readjustment of the color of the first projection image, a third generation step of generating correction data used to correct the projection condition so that the comparative image coincides with the reference image, and a correction step of correcting the projection condition based on the correction data.

Another aspect for solving the problem described above is directed to a display system including a projector, a camera which is coupled to the projector so as to communicate with the projector, and which is configured to take a projection image by the projector, and one or more processors programmed to make the projector project a test pattern in a reference state in which a projection condition is adjusted so that a color of the projection image when viewed from front becomes a desired color, and make the camera take the projection image corresponding to the test pattern to generate a reference image, make the projector project the test pattern and then make the camera take the projection image corresponding to the test pattern to generate a comparative image when performing a readjustment of the color of the projection image, generate correction data used to correct the projection condition so that the comparative image coincides with the reference image, and correct the projection condition based on the correction data.

Still another aspect for solving the problem described above is directed to a method of controlling a projector including a first generation step of projecting a test pattern in a reference state in which a projection condition of the projector is adjusted so that a color of a projection image when viewed from front becomes a desired color, and making a camera take the projection image corresponding to the test pattern to generate a reference image, a second generation step of projecting the test pattern and then making the camera take the projection image corresponding to the test pattern to generate a comparative image when performing a readjustment of the color of the projection image, a third generation step of generating correction data used to correct the projection condition so that the comparative image coincides with the reference image, and a correction step of correcting the projection condition based on the correction data.

Still another aspect for solving the problem described above is directed to a method of controlling a display system which is provided with a first projector including a first camera and projecting a first projection image, and a second projector including a second camera and projecting a second projection image, and which is configured to perform tiling display of the first projection image and the second projection image, the method including a first generation step of projecting a test pattern by the first projector in a reference state in which a first projection condition of the first projector and a second projection condition of the second projector are adjusted, then taking the first projection image corresponding to the test pattern by the first camera to generate a taken image as a first reference image, then projecting a test pattern by the second projector in the reference state, and then taking the second projection image corresponding to the test pattern by the second camera to generate a taken image as a second reference image, a second generation step of projecting the test pattern by the first projector, then taking the first projection image corresponding to the test pattern by the first camera to generate a taken image as a first comparative image, then projecting the test pattern by the second projector, and then taking the second projection image corresponding to the test pattern by the second camera to generate a taken image as a second comparative image when performing a readjustment of colors of the first projection image and the second projection image, a third generation step of generating, by the first projector, first correction data used to correct the first projection condition so that the first comparative image coincides with the first reference image, and generating, by the second projector, second correction data used to correct the second projection condition so that the second comparative image coincides with the second reference image, and a correction step of correcting the first projection condition by the first projector based on the first correction data, and correcting the second projection condition by the second projector based on the second correction data.

Still another aspect for solving the problem described above is directed to a display system including a display device, a control device, and a first imaging device configured to image a screen from a first direction, wherein the first imaging device is configured to take a projection image, which is displayed by the display device on the screen in a projection condition set using a second imaging device configured to image the screen from a second direction different from the first direction, from the first direction to generate a first taken image, the control device stores the first taken image generated by the first imaging device, makes the display device display the projection image on the screen in the projection condition, makes the imaging device take the projection image displayed on the screen to generate a second taken image, and generates correction data used to correct the projection condition based on the first taken image and the second taken image, and the display device adjusts the projection condition with the correction data.

Still another aspect for solving the problem described above is directed to a method of controlling a projector including a camera configured to image a screen from a first direction, the method including the steps of making the camera take a projection image, which is projected on the screen in a projection condition set using a taken image obtained by imaging the screen from a second direction different from the first direction, from the first direction to generate a first taken image, and then storing the first taken image, when performing a readjustment, projecting the projection image on the screen in the projection condition, making the camera take the projection image displayed on the screen from the first direction to generate a second taken image, and correcting the projection condition based on the first taken image and the second taken image.

DESCRIPTION OF EXEMPLARY EMBODIMENTS

Some embodiments of the present disclosure will hereinafter be described with reference to the drawings.

1. First Embodiment 1-1. Configuration of Display System

Figure 1:
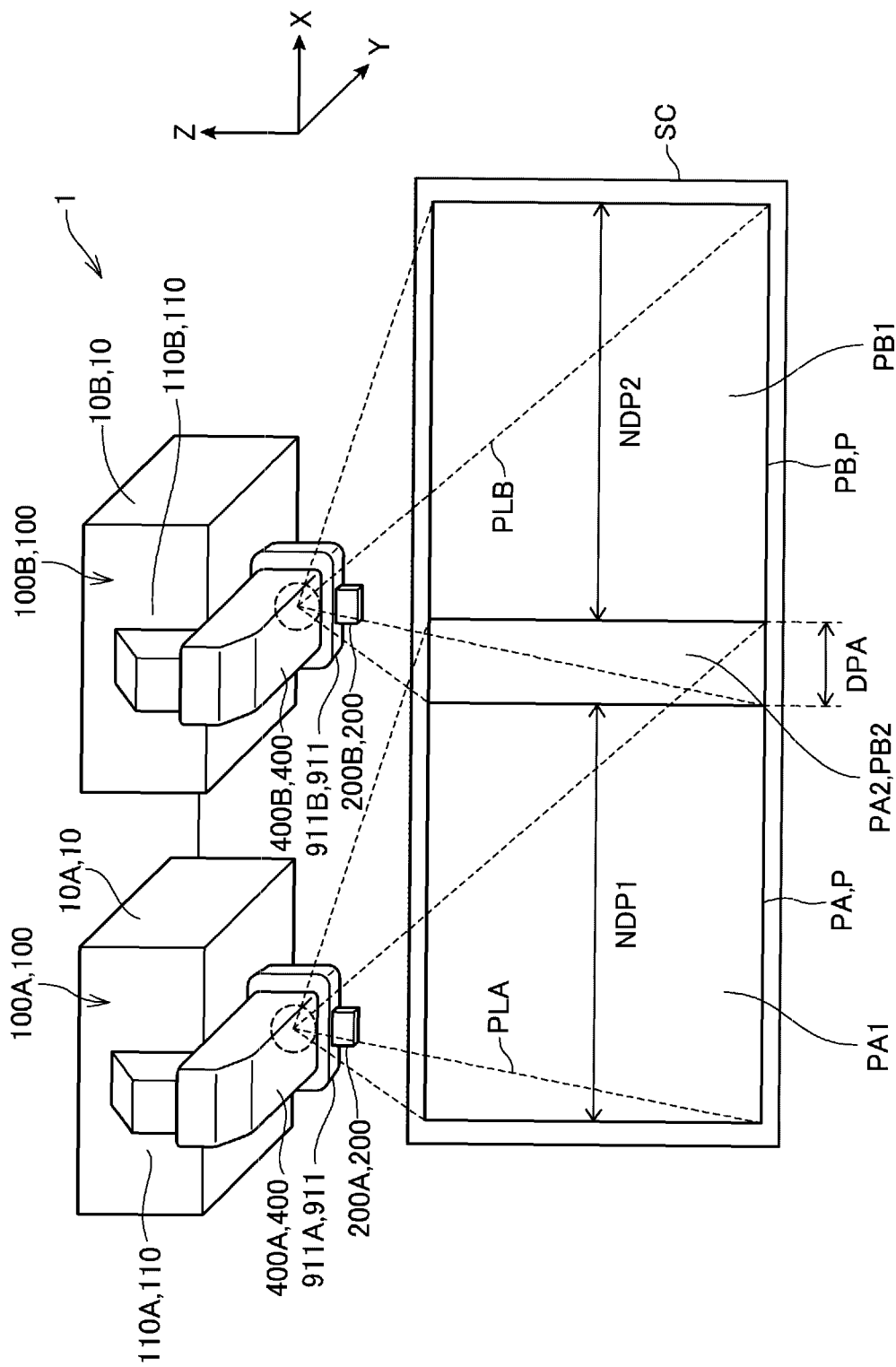
FIG. 1 is a diagram showing an example of a configuration of a display system according to a first embodiment.

FIG. 1 is a diagram showing an example of a configuration of a display system 1 according to the present embodiment.

In FIG. 1, there are described an X axis, a Y axis, and a Z axis perpendicular to each other. The Z axis represents a vertical direction. The X axis and the Y axis are parallel to a horizontal direction. The X axis represents a left-right direction, and the Y axis represents a front-back direction. The positive direction of the X axis represents the right direction, the positive direction of the Y axis represents the front direction, and the positive direction of the Z axis represents the upper direction.

The display system 1 is provided with a first projector 100A and a second projector 100B. FIG. 1 shows the state in which the first projector 100A and the second projector 100B are suspended from the ceiling in front of a screen SC having a rectangular shape installed on a wall in a vertical direction. The viewer as a user is located in a viewing area AR below the first projector 100A and the second projector 100B and in front of the screen SC, and visually recognizes an image displayed on the screen SC. The viewing area AR will be described later with reference to FIG. 4.

The first projector 100A and the second projector 100B are supplied with image data from an image supply device not shown and coupled to each of the first projector 100A and the second projector 100B so as to be able to communicate with each of the first projector 100A and the second projector 100B. The first projector 100A projects an image light beam PLA corresponding to the image data thus received to display a first projection image PA on the screen SC. The second projector 100B projects an image light beam PLB corresponding to the image data thus received to display a second projection image PB on the screen SC.

The first projector 100A is provided with a projector main body 10A, a projection optical device 400A, and a first camera 200A. The projector main body 10A is disposed so as to be suspended from the ceiling. The projection optical device 400A is mounted on a mounting part 110A of the projector main body 10A so as to be able to project the image light beam PLA on the screen SC. The first camera 200A is coupled to the projector main body 10A so as to be able to communicate with the projector main body 10A, and is installed in an attachment part 911A of the projection optical device 400A so as to be able to take the first projection image PA displayed on the screen SC.

The second projector 100B is provided with a projector main body 10B, a projection optical device 400B, and a second camera 200B. The projector main body 10B is disposed so as to be suspended from the ceiling. The projection optical device 400B is mounted on a mounting part 110B of the projector main body 10B so as to be able to project the image light beam PLB on the screen SC. The second camera 200B is coupled to the projector main body 10B so as to be able to communicate with the projector main body 10B, and is installed in an attachment part 911B of the projection optical device 400B so as to be able to take the second projection image PB displayed on the screen SC.

The projector main body 10A generates the image light beam PLA corresponding to the image data. The projection optical device 400A projects the image light beam PLA generated by the projector main body 10A to the screen SC. The first camera 200A takes an image of the area of the screen SC including the first projection image PA displayed on the screen SC to generate a taken image PM. The taken image PM thus taken is used for an adjustment of a projection condition of the first projector 100A. The adjustment of the projection condition includes a color adjustment of the first projection image PA.

The projector main body 10B generates the image light beam PLB corresponding to the image data. The projection optical device 400B projects the image light beam PLB generated by the projector main body 10B to the screen SC. The second camera 200B takes an image of the area of the screen SC including the second projection image PB displayed on the screen SC to generate the taken image PM. The taken image PM thus taken is used for an adjustment of a projection condition of the second projector 100B. The adjustment of the projection condition includes a color adjustment of the second projection image PB.

The display system 1 shown in FIG. 1 displays the first projection image PA and the second projection image PB so as to be arranged side by side in the left-right direction of the screen SC to thereby achieve tiling display of a single large landscape image. When performing the tiling display of the first projection image PA and the second projection image PB, the first projector 100A and the second projector 100B project the image light beam PLA and the image light beam PLB so that a superimposed area DPA where the first projection image PA and the second projection image PB are superimposed on each other is generated.

As shown in FIG. 1, the first projection image PA is constituted by a first non-superimposed image PA1 corresponding to a first non-superimposed area NDP1, and a first superimposed image PA2 corresponding to the superimposed area DPA. The first non-superimposed area NDP1 represents an area other than the superimposed area DPA in an area corresponding to the first projection image PA. The second projection image PB is constituted by a second non-superimposed image PB1 corresponding to a second non-superimposed area NDP2, and a second superimposed image PB2 corresponding to the superimposed area DPA. The second non-superimposed area NDP2 represents an area other than the superimposed area DPA in an area corresponding to the second projection image PB.

The luminance of the first superimposed image PA2 is adjusted so as to be lower than the luminance of the first non-superimposed image PA1, and the luminance of the second superimposed image PB2 is adjusted so as to be lower than the luminance of the second non-superimposed image PB1. Such an adjustment process of the luminance in the superimposed area DPA is called an edge blending process.

In the display system 1, there is performed an initial adjustment process including the edge blending process when performing initialization. In the initial adjustment process, the respective projection conditions are adjusted so that an image to be displayed on the screen becomes in a state desired by the viewer in the initialization. Regarding the colors of the image, the projection conditions of the first projector 100A and the second projector 100B are adjusted so as to achieve colors desired by the viewer in the initialization. The projection condition of the first projector 100A is a "first projection condition," and the projection condition of the second projector 100B is a "second projection condition."

The first projection image PA to be projected by the first projector 100A and the second projection image PB to be projected by the second projector 100B are displayed with colors shifted from the colors desired by the viewer even in the projection conditions set by the initialization due to a temporal change of internal components or a change in environment including the screen SC. In this case, a readjustment process is performed in the display system 1 so that the colors of the image displayed become the colors desired by the viewer. The adjustment related to these colors is performed as an automatic color adjustment process.

The first projector 100A and the second projector 100B have respective configurations substantially the same as each other. In the following description, the first projector 100A and the second projector 100B are each described as a projector 100 when the first projector 100A and the second projector 100B are not distinguished from each other. Further, the projector main body 10A and the projector main body 10B are each described as a projector main body 10 when the projector main body 10A and the projector main body 10B are not distinguished from each other. Further, the first camera 200A and the second camera 200B are each described as a camera 200 when the first camera 200A and the second camera 200B are not distinguished from each other. Further, the projection optical device 400A and the projection optical device 400B are each described as a projection optical device 400 when the projection optical device 400A and the projection optical device 400B are not distinguished from each other. Further, the image light beam PLA and the image light beam PLB are each described as an image light beam PL when the image light beam PLA and the image light beam PLB are not distinguished from each other. Further, the first projection image PA and the second projection image PB are each described as a projection image P when the first projection image PA and the second projection image PB are not distinguished from each other.

1-2. Configuration of Projector

Figure 2:
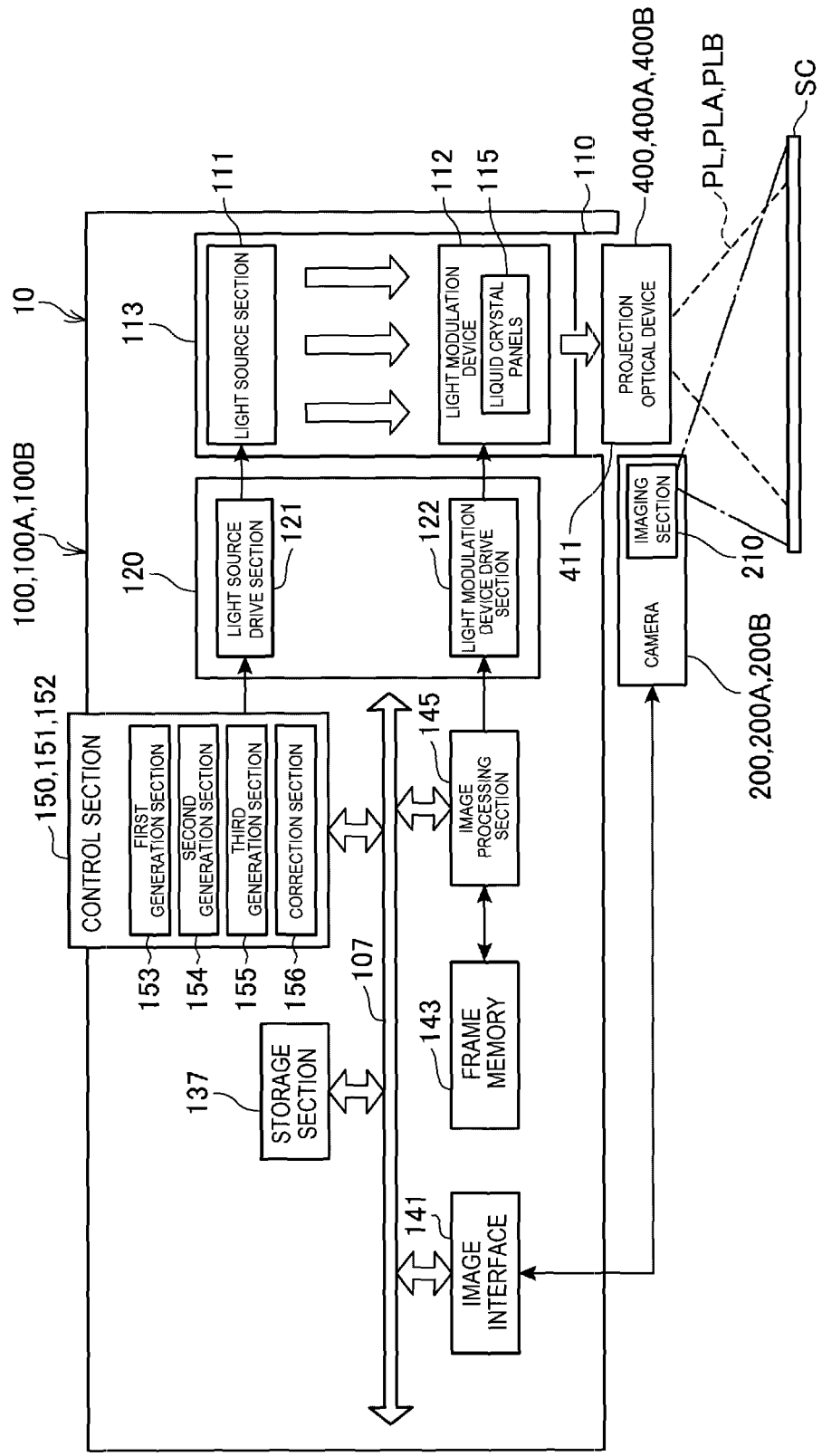
FIG. 2 is a block diagram showing an example of a configuration of a projector.

FIG. 2 is a diagram showing an example of a configuration of the projector 100 according to the present embodiment.

As shown in FIG. 1, the projector 100 is provided with the projector main body 10, the projection optical device 400, and the camera 200.

The projector main body 10 is provided with an optical unit 113, a drive section 120, a storage section 137, an image interface 141, a frame memory 143, an image processing section 145, and a control section 150. The optical unit 113, the drive section 120, the storage section 137, the image interface 141, the image processing section 145, and the control section 150 are coupled to each other so as to be able to achieve data communication with each other via an internal bus 107.

The optical unit 113 is provided with a light source section 111 and a light modulation device 112, and performs formation of optical image to generate the image light beam PL. The drive section 120 is provided with a light source drive section 121 and a light modulation device drive section 122.

The light source section 111 is provided with a lamp such as a halogen lamp, a xenon lamp, or a super-high pressure mercury lamp, or a solid-state light source such as an LED (Light Emitting Diode) or a laser source.

The light source drive section 121 puts on and off the light source section 111 in accordance with an instruction by the control section 150.

The light modulation device 112 is provided with liquid crystal panels 115 for modulating light transmitted through the liquid crystal panels 115 to generate the image light beam PL. The liquid crystal panels 115 include a liquid crystal panel corresponding to a red light beam, a liquid crystal panel corresponding to a green light beam, and a liquid crystal panel corresponding to a blue light beam. The light emitted by the light source section 111 is separated into colored light beams of the three colors of red, green, and blue, and the colored light beams respectively enter the corresponding liquid crystal panels 115. The image light beams PL having passed through the respective liquid crystal panels 115 to thereby be modulated are combined with each other by a combining optical system such as a cross dichroic prism, and are then emitted from the optical unit 113.

The light modulation device drive section 122 drives the light modulation device 112. The image data corresponding to the respective primary colors of red, green, and blue are input from the image processing section 145 to the light modulation device drive section 122, and the light modulation device drive section 122 converts the image data thus input into data signals suitable to operations of the liquid crystal panels 115. The light modulation device drive section 122 applies a voltage to each pixel of the liquid crystal panels 115 based on the data signal thus converted to thereby draw images on the liquid crystal panels 115.

The storage section 137 is a nonvolatile storage device. The storage section 137 stores a program to be executed by the control section 150, data having been processed by the control section 150, the image data, and so on.

The image interface 141 is provided with a connector and an interface circuit, and is configured so as to be able to be connected with wire or wirelessly to the image supply device for supplying the projector 100 with the image data, and to the camera 200 for supplying taken image data. The taken image data includes the taken image.

The frame memory 143 is a storage device provided with a plurality of banks. Each of the banks has a storage capacity sufficient for writing the image data corresponding to one frame.

The image data input from the image supply device via the image interface 141 to the image processing section 145 is developed in the frame memory 143 by the image processing section 145. The image processing section 145 performs image processing such as a resolution conversion process, a resizing process, correction of a distortion aberration, a shape correction process, a digital zoom process, and an adjustment of tint and luminance of the image on the image data developed in the frame memory 143. The image processing section 145 can be formed of an integrated circuit. Further, the image processing section 145 can also be a combination of a processor and an integrated circuit.

The control section 150 is provided with a memory 151 and a processor 152. The memory 151 is a storage device for storing programs and data to be executed by the processor 152. The processor 152 is a processor which executes the control program to thereby control each section of the projector 100.

The control section 150 controls the optical unit 113 to generate the image light beam PL corresponding to the image data supplied from the image supply device. The control section 150 adjusts the projection condition of the image light beam PL, and then sets the projection condition thus adjusted into the projector 100.

Further, the control section 150 functions as a first generation section 153, a second generation section 154, a third generation section 155, and a correction section 156 in order to perform the readjustment process.

Ina reference state ST, the first generation section 153 makes the optical unit 113 generate a test pattern TP, then makes the camera 200 take the projection image P corresponding to the test pattern TP, and then generates the taken image PM as a reference image PS. The "reference state ST" and the "reference image PS" will be described later.

The test pattern TP includes, for example, luminance patterns of a plurality of gray levels with respect to each of the colors of RGB, namely the red color, the green color, and the blue color. The plurality of gray levels is, for example, five gray levels. In this case, the test pattern TP includes fifteen patterns. The test pattern TP is, for example, a so-called "solid pattern" in which the color and the luminance of the image do not vary with the projection position.

When performing the readjustment of the color of the projection image P, the second generation section 154 makes the optical unit 113 generate the test pattern TP, then makes the camera 200 take the projection image P corresponding to the test pattern TP, and then generates the taken image PM as a comparative image PC. The "comparative image PC" will be described later.

The third generation section 155 generates correction data DC for correcting the projection condition of the projector 100 so that the comparative image PC coincides with the reference image PS. The "correction data DC" will be described later.

The correction section 156 corrects the projection condition of the projector 100 based on the correction data DC. The correction section 156 corrects the projection condition of the projector 100 so that the comparative image PC coincides with the reference image PC.

The projection optical device 400 is mounted on the mounting part 110 of the projector main body 10, and is provided with a lens, a mirror, or the like not shown and for imaging the image light beam PL generated by the optical unit 113 on the screen SC. To the projection optical device 400, there is attached the camera 200 so that an area including the projection image P displayed on the screen SC becomes the imaging range of the camera 200. The projection optical device 400 can also be provided with a zoom mechanism for magnifying or demagnifying the image to be projected on the screen SC, a focus adjustment mechanism for performing an adjustment of the focus, and so on. The projection optical device 400 according to the present embodiment is a "bent type projection optical device" of bending and projecting the image light beam PL for the purpose of shortening the focal length.

The camera 200 is provided with an imaging section 210, and is attached to the attachment part 911 of the projection optical device 400. The imaging section 210 is provided with a lens and an imaging element. The lens images the incident light from the imaging range on the imaging element. The imaging element is formed of a CCD, a CMOS, or the like to generate the image signal.

The camera 200 takes the projection image P displayed on the screen SC with the imaging section 210 in accordance with the control by the projector main body 10, and then outputs the taken image data to the image interface 141 of the projector main body 10.

1-3. Automatic Color Adjustment Process

Figure 3:
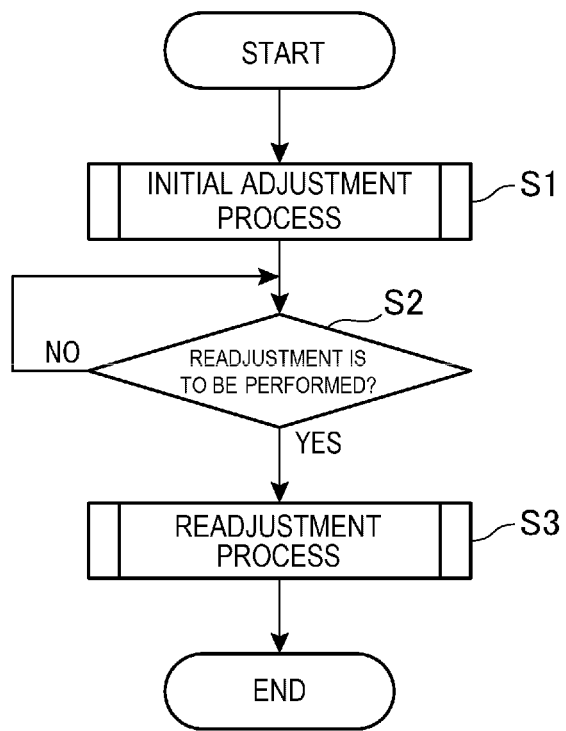
FIG. 3 is a flowchart showing an example of an automatic color adjustment process.

FIG. 3 is a flowchart showing the whole of an automatic color adjustment process of the display system 1.

In the step S1, an initial adjustment process is executed.

The initial adjustment process represents processing of adjusting the projection condition of the projector 100 so that the color of the projection image P when viewed from the front becomes the desired color to set the reference state ST. In the initial adjustment process, the color adjustment is performed based on the taken image PM including the image taken by a third camera 500.

The initial adjustment process includes a reference generation process in which the camera 200 takes the projection image P projected by the projector 100 in the reference state ST, and the projector 100 stores the result as the reference image PS. The "initial adjustment process" and the "third camera" will be described later with reference to FIG. 4 and FIG. 5.

In the step S2, the display system 1 determines whether to execute the readjustment process.

When it is determined that the readjustment process is not executed (NO in the step S2), the readjustment process becomes in a standby state. When it is determined that the readjustment process is to be executed (YES in the step S2), the process proceeds to the step S3. Execution of the readjustment process is determined in accordance with automatic determination by time setting or the like, or with an instruction by the user.

In the step S3, the display system 1 executes the readjustment process, and then terminates the process.

The readjustment process represents processing of making the projector 100 generate the taken image PM as the comparative image PC, then generating the correction data DC for correcting the projection condition of the projector 100 so that the comparative image PC coincides with the reference image PS, and then correcting the projection condition of the projector 100 based on the correction data DC. In the readjustment process, the projection condition of the projector 100 is adjusted based on the reference image PS and the comparative image PC, but the reference image PS and the comparative image PC are the taken image PM taken by the camera 200. The "readjustment process" will be described later with reference to FIG. 6 and FIG. 7.

Figure 4:
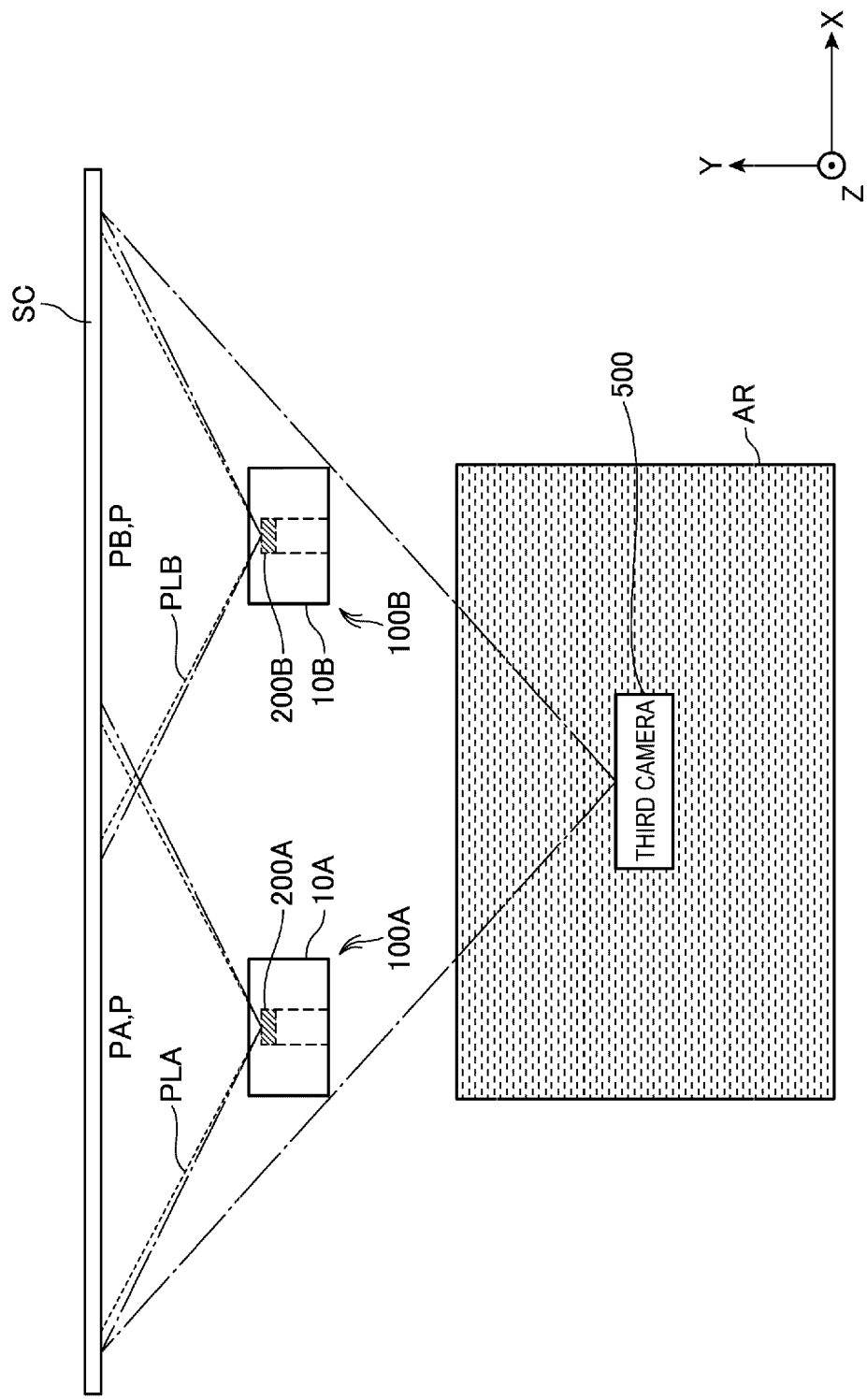
FIG. 4 is a plan view showing an example of the configuration of the display system when performing an initial adjustment process.
Figure 5:
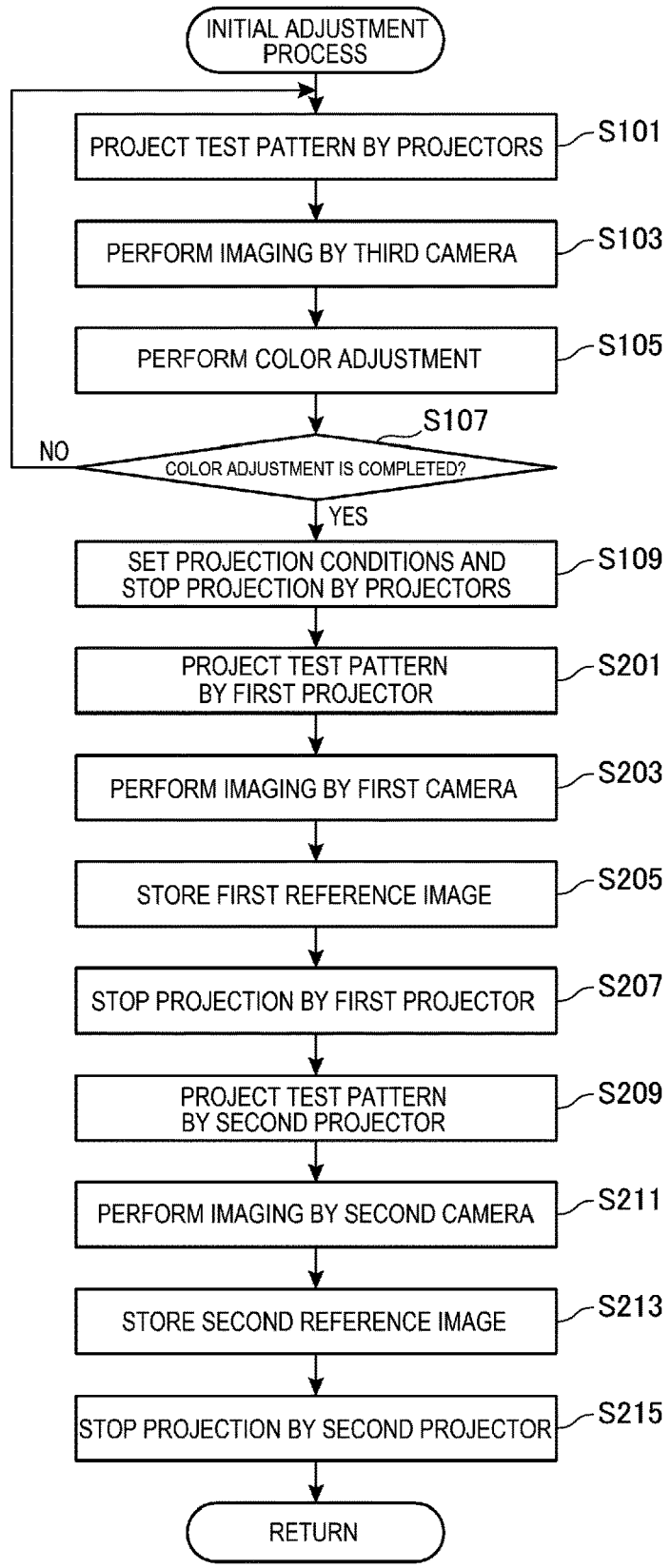
FIG. 5 is a flowchart showing an example of the initial adjustment process.

FIG. 4 shows an example of a configuration of the display system 1 when executing the initial adjustment process, and FIG. 5 is a flowchart showing an example of the initial adjustment process of the display system 1.

FIG. 4 is a plan view corresponding to FIG. 1, and shows the fact that the third camera 500 is disposed at the center of the viewing area AR when performing the initial adjustment.

The viewing area AR is an area for the viewer to visually recognize the projection image P displayed on the screen SC in a standing state or a state in which the viewer sits on a chair, and is an area substantially right in front of the screen SC.

The color adjustment process in the initial adjustment is executed using the third camera 500.

The configuration of the third camera 500 is substantially the same as the configuration of the camera 200. It should be noted that the camera 200 is attached to the projection optical device 400 of the projector 100 to take an image of the screen SC from the projection direction on the one hand, but the third camera 500 takes the image of the screen SC from the viewing direction of the user located in the viewing area AR on the other hand. The third camera 500 is supported by a tripod or the like not shown so as to be at the same level as the viewpoint of the user, and is disposed at a representative position such as the center of the viewing area AR.

The initial adjustment process of the display system 1 shown in FIG. 5 is executed with the configuration shown in FIG. 4. The user who makes the initial adjustment process be executed is a service person who installs the display system 1.

In the step S101, the projector 100 projects the test pattern TP on the screen SC.

In the step S103, the third camera 500 takes the projection image P displayed on the screen SC to generate the taken image PM.

In the step S105, the projector 100 executes the color adjustment process based on the taken image PM.

In the step S107, the projector 100 determines whether or not the color adjustment process is completed. When the projector 100 has determined that the color adjustment process is not completed (NO in the step S107), the process returns to the step S101. When the projector 100 has determined that the color adjustment process is completed (YES in the step S107), the process proceeds to the step S109.

In the step S109, the projector 100 sets the projection condition in which the color adjustment process has been completed, and stops the projection of the test pattern TP. The projection conditions are respectively set to the first projector 100A and the second projector 100B, and the first projector 100A and the second projector 100B are set to the reference state ST.

The display system 1 according to the present embodiment performs the tiling display with the first projector 100A and the second projector 100B. The reference state ST in the present embodiment is a state in which the adjustment of the tiling display including the edge blending process is also completed.

As described above, the reference state ST is the state in which the projection condition of the projector 100 is adjusted so that the color of the projection image P when viewed from the front becomes the desired color. The desired color is set by the user. Further, it is possible for the desired color to be set in advance as a target color with respect to the color of the taken image PM taken by the third camera 500, and an automatic adjustment can be performed by the projector 100 and the third camera 500 in cooperation with each other.

Then, the display system 1 generates the reference image PS in the reference state ST.

In the step S201, the first projector 100A projects the test pattern TP.

In the step S203, the first projector 100A makes the first camera 200A take the first projection image PA corresponding to the test pattern TP to generate the taken image PM as a first reference image PS1.

In the step S205, the first projector 100A makes the storage section 137 store the first reference image PS1.

In the step S207, the first projector 100A stops the projection of the test pattern TP.

In the step S209, the second projector 100B projects the test pattern TP.

In the step S211, the second projector 100B makes the second camera 200B take the second projection image PB corresponding to the test pattern TP to generate the taken image PM as a second reference image PS2.

In the step S213, the second projector 100B makes the storage section 137 store the second reference image PS2.

In the step S215, the second projector 100B stops the projection of the test pattern TP.

The step S201, the step S203, the step S209, and the step S211 correspond to an example of a "first generation step."

In the "first generation step," the first projector 100A stores the first reference image PS1 obtained by the first camera 200A taking the first projection image PA projected on the screen SC in the reference state ST, the second projector 100B stores the second reference image PS2 obtained by the second camera 200B taking the second projection image PB projected on the screen SC in the reference state ST, and the reference generation process is completed.

By completing the reference generation process, the initial adjustment process is completed.

Figure 6:
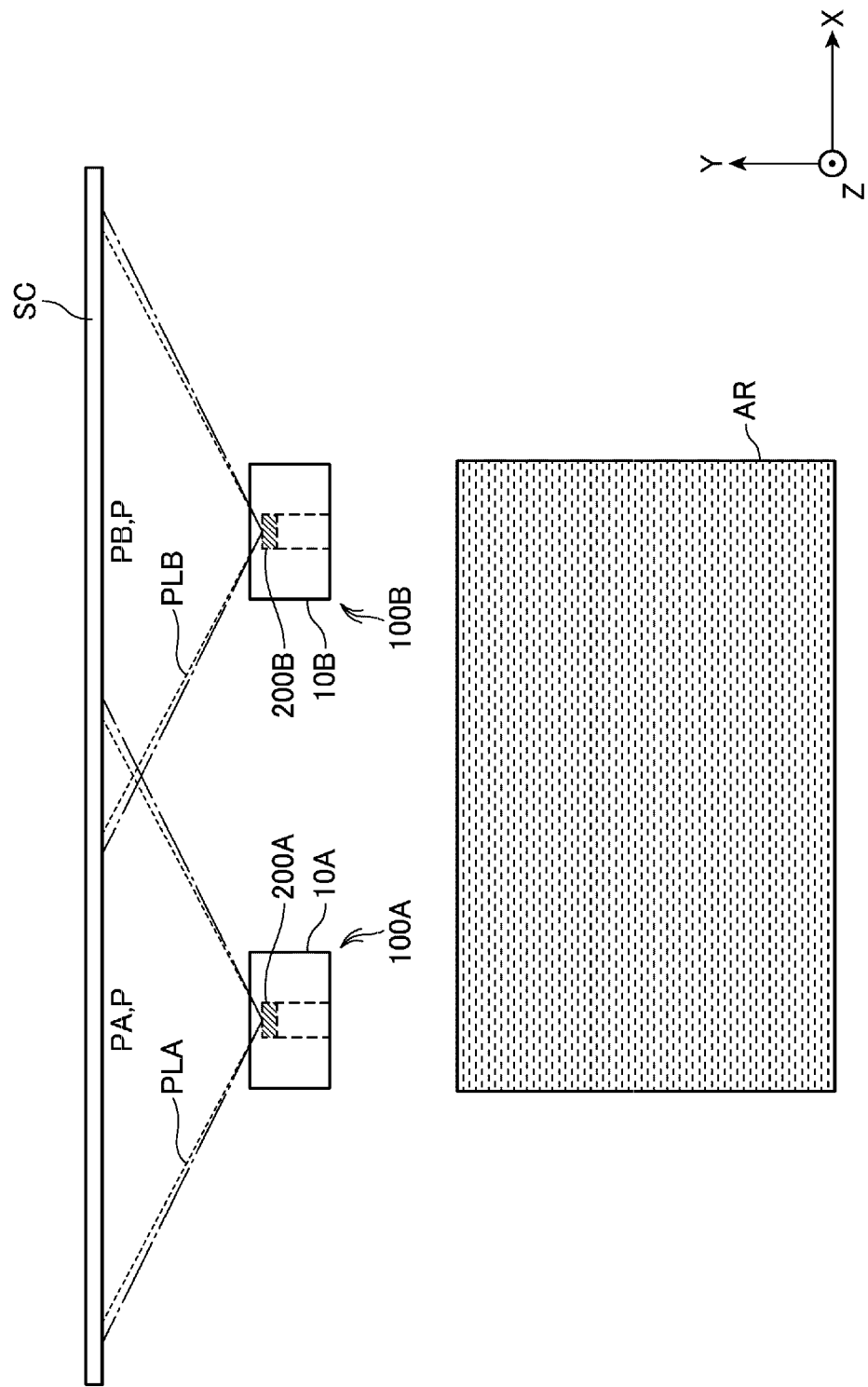
FIG. 6 is a plan view showing an example of the configuration of the display system when performing a readjustment process.
Figure 7:
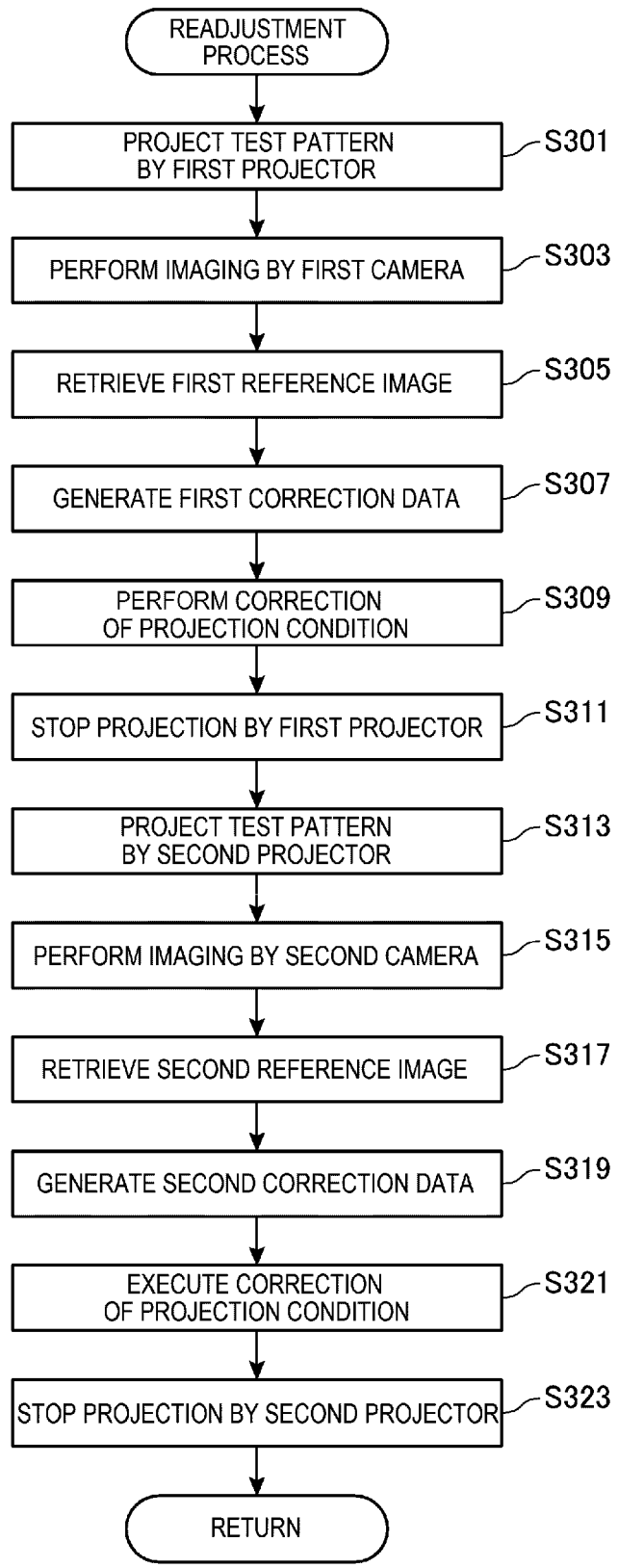
FIG. 7 is a flowchart showing an example of the readjustment process.

FIG. 6 shows an example of a configuration of the display system 1 when performing the readjustment process, and is a plan view corresponding to FIG. 1. FIG. 7 is a flowchart showing an example of the readjustment process of the display system 1.

In the step S301, the first projector 100A projects the test pattern TP.

In the step S303, the first projector 100A makes the first camera 200A take the first projection image PA corresponding to the test pattern TP to generate the taken image PM as a first comparative image PC1.

In the step S305, the first projector 100A retrieves the first reference image PS1 from the storage section 137.

In the step S307, the first projector 100A generates first correction data DC1 for correcting the projection condition of the first projector 100A so that the first comparative image PC1 coincides with the first reference image PS1.

In the step S309, the first projector 100A corrects the projection condition of the first projector 100A based on the first correction data DC1.

In the step S311, the first projector 100A sets the projection condition thus corrected, and stops the projection of the test pattern TP.

In the step S313, the second projector 100B projects the test pattern TP.

In the step S315, the second projector 100B makes the second camera 200B take the second projection image PB corresponding to the test pattern TP to generate the taken image PM as a second comparative image PC2.

In the step S317, the second projector 100B retrieves the second reference image PS2 from the storage section 137.

In the step S319, the second projector 100B generates second correction data DC2 for correcting the projection condition of the second projector 100B so that the second comparative image PC2 coincides with the second reference image PS2.

In the step S321, the second projector 100B corrects the projection condition of the second projector 100B based on the second correction data DC2.

In the step S323, the second projector 100B sets the projection condition thus corrected, and stops the projection of the test pattern TP, and then the process is terminated.

The step S301, the step S303, the step S313, and the step S315 correspond to an example of a "second generation step." The step S307 and the step S319 correspond to an example of a "third generation step." The step S309 and the step S321 correspond to an example of a "correction step."

In the "second generation step," the "third generation step," and the "correction step," the display system 1 is readjusted so that the projection image P including the tiling display to be displayed on the screen SC has the desired color without using the third camera 500.

Hereinabove, as shown in FIG. 1 through FIG. 7, the method of controlling the display system 1 according to the present embodiment is the method of controlling the display system 1 provided with the first projector 100A and the first camera 200A which is coupled to the first projector 100A so as to be able to communicate with the first projector 100A, and which takes the first projection image PA by the first projector 100A, and includes the first generation step in which the first projector 100A projects the test pattern TP in the reference state ST in which the projection condition of the first projector 100A is adjusted so that the color of the first projection image PA when viewed from the front becomes the desired color, and the first camera 200A takes the first projection image PA corresponding to the test pattern TP to generate the taken image PM as the first reference image PS1, the second generation step in which the first projector 100A projects the test pattern TP and the first camera 200A takes the first projection image PA corresponding to the test pattern TP to generate the taken image PM as the first comparative image PC1 when performing the readjustment of the color of the first projection image PA, the third generation step of generating the first correction data DC1 for correcting the projection condition so that the first comparative image PC1 coincides with the first reference image PS1, and the correction step of correcting the projection condition based on the first correction data DC1.

Therefore, since the first correction data DC1 for correcting the projection condition is generated so that the first comparative image PC1 coincides with the first reference image PS1, and the projection condition is corrected based on the first correction data DC1, it is possible to easily execute the color adjustment when performing the readjustment.

Further, the reference state ST represents the state obtained after the third camera 500 different from the first camera 200A is disposed in the viewing area AR representing the area where the user is located when the user visually recognizes the first projection image PA, and the projection condition of the first projector 100A is adjusted based on the taken image PM generated by the third camera 500 taking the first projection image PA.

Therefore, since the third camera 500 is disposed in the viewing area AR, and the projection condition of the first projector 100A is adjusted based on the taken image PM generated by the third camera 500 taking the first projection image PA, it is possible to adjust the projection condition so that the color of the first projection image PA visually recognized by the user becomes the desired color. Therefore, it is possible to accurately adjust the projection condition of the first projector 100A.

Further, in the reference state ST, the third camera 500 is disposed at substantially the central position of the viewing area AR.

Therefore, since the third camera 500 is disposed at substantially the central position of the viewing area AR, it is possible to adjust the projection condition so that the color of the first projection image PA visually recognized by the user becomes the desired color. Therefore, it is possible to accurately adjust the projection condition of the first projector 100A.

Further, the first camera 200A is disposed outside the viewing area AR.

Therefore, since there is no need to dispose the first camera 200A in the viewing area AR, it is possible to easily adjust the projection condition of the first projector 100A.

Further, the first camera 200A is provided to the first projector 100A.

Therefore, since the relative position of the first camera 200A to the first projector 100A is fixed, it is possible for the first camera 200A to easily generate the first projection image PA projected by the first projector 100A.

Further, the first projector 100A is provided with the projection optical device 400A of the bent type, and the first camera 200A is disposed in an end portion at a projection side of the projection optical device 400.

Therefore, since the first camera 200A is disposed in the end portion at the projection side of the projection optical device 400, it is possible to prevent an obstacle such as a chassis EN of the first projector 100A from being located between the first camera 200A and the screen SC. Therefore, it is possible for the first camera 200A to easily generate the first projection image PA projected by the first projector 100A.

Further, the display system 1 is provided with the second projector 100B different from the first projector 100A, the second projection image PB projected by the second projector 100B is subject to the tiling display together with the first projection image PA, and the first projector 100A and the second projector 100B project the test pattern TP in sequence in each of the first generation step and the second generation step.

Therefore, since the first projector 100A and the second projector 100B project the test pattern TP in sequence in each of the first generation step and the second generation step, it is possible to efficiently generate the first reference image PS1 and the first comparative image PC1 of the first projector 100A, and the second reference image PS2 and the second comparative image PC2 of the second projector 100B. Therefore, it is possible to efficiently adjust the projection condition of the first projector 100A and the projection condition of the second projector 100B.

The display system 1 according to the embodiment of the present disclosure is the display system 1 provided with the projector 100 and the camera 200 which is coupled to the projector 100 so as to be able to communicate with the projector 100, and which takes the projection image P of the projector 100, wherein the projector 100 is provided with the first generation section 153 which projects the test pattern TP in the reference state ST in which the projection condition of the projector 100 is adjusted so that the color of the projection image P when viewed from the front becomes the desired color, and makes the camera 200 take the projection image P corresponding to the test pattern TP to generate the taken image PM as the reference image PS, the second generation section 154 which projects the test pattern TP, and makes the camera 200 take the projection image P corresponding to the test pattern TP to generate the taken image PM as the comparative image PC when performing the readjustment of the color of the projection image P, the third generation section 155 which generates the correction data DC for correcting the projection condition so that the comparative image PC coincides with the reference image PS, and the correction section 156 which corrects the projection condition based on the correction data DC.

Therefore, since the first correction data DC for correcting the projection condition is generated so that the comparative image PC coincides with the reference image PS, and the projection condition is corrected based on the correction data DC, it is possible to easily execute the color adjustment when performing the readjustment.

The method of controlling the projector 100 according to the embodiment of the present disclosure is the method of controlling the projector 100 provided with the camera 200 for taking the projection image P projected on the screen SC, and includes the first generation step of projecting the test pattern TP in the reference state ST in which the projection condition of the projector 100 is adjusted so that the color of the projection image P when viewed from the front becomes the desired color, and making the camera 200 take the projection image P corresponding to the test pattern TP to generate the taken image PM as the reference image PS, the second generation step of projecting the test pattern TP and then making the camera 200 take the projection image P corresponding to the test pattern TP to generate the taken image PM as the comparative image PC when performing the readjustment of the color of the projection image P, the third generation step of generating the correction data DC for correcting the projection condition so that the comparative image PC coincides with the reference image PS, and the correction step of correcting the projection condition based on the correction data DC.

Therefore, since the first correction data DC for correcting the projection condition is generated so that the comparative image PC coincides with the reference image PS, and the projection condition is corrected based on the correction data DC, it is possible to easily execute the color adjustment when performing the readjustment.

The method of controlling the display system 1 according to the embodiment of the present disclosure is the method of controlling the display system 1 which is provided with the first projector 100A having the first camera 200A and projecting the first projection image PA, and the second projector 100B having the second camera 200B and projecting the second projection image PB, and which performs the tiling display of the first projection image PA and the second projection image PB, and includes the first generation step in which the first projector 100A projects the test pattern TP, the first camera 200A takes the first projection image PA corresponding to the test pattern TP to generate the taken image PM as the first reference image PS1, the second projector 100B projects the test pattern TP, and the second camera 200B takes the second projection image PB corresponding to the test pattern TP to generate the taken image PM as the second reference image PS2 in the reference state ST in which the first projection condition of the first projector 100A and the second projection condition of the second projector 100B are adjusted, the second generation step in which the first projector 100A projects the test pattern TP, the first camera 200A takes the first projection image PA corresponding to the test pattern TP to generate the taken image PM as the first comparative image PC1, the second projector 100B projects the test pattern TP, and the second camera 200B takes the second projection image PB corresponding to the test pattern TP to generate the taken image PM as the second comparative image PC2 when performing the readjustment of the color of the first projection image PA and the second projection image PB, the third generation step in which the first projector 100A generates the first correction data DC1 for correcting the projection condition so that the first comparative image PC1 coincides with the first reference image PS1, and the second projector 100B generates the second correction data DC2 for correcting the projection condition so that the second comparative image PC2 coincides with the second reference image PS2, and the correction step in which the first projector 100A corrects the projection condition based on the first correction data DC1, and the second projector 100B corrects the projection condition based on the second correction data DC2.

Therefore, it is possible for the first projector 100A and the second projector 100B to easily perform the color adjustment of the tiling display by adjusting the respective projection conditions with the respective correction data DC. In this case, it is not required to newly perform the edge blending process.

2. Second Embodiment

Figure 8:
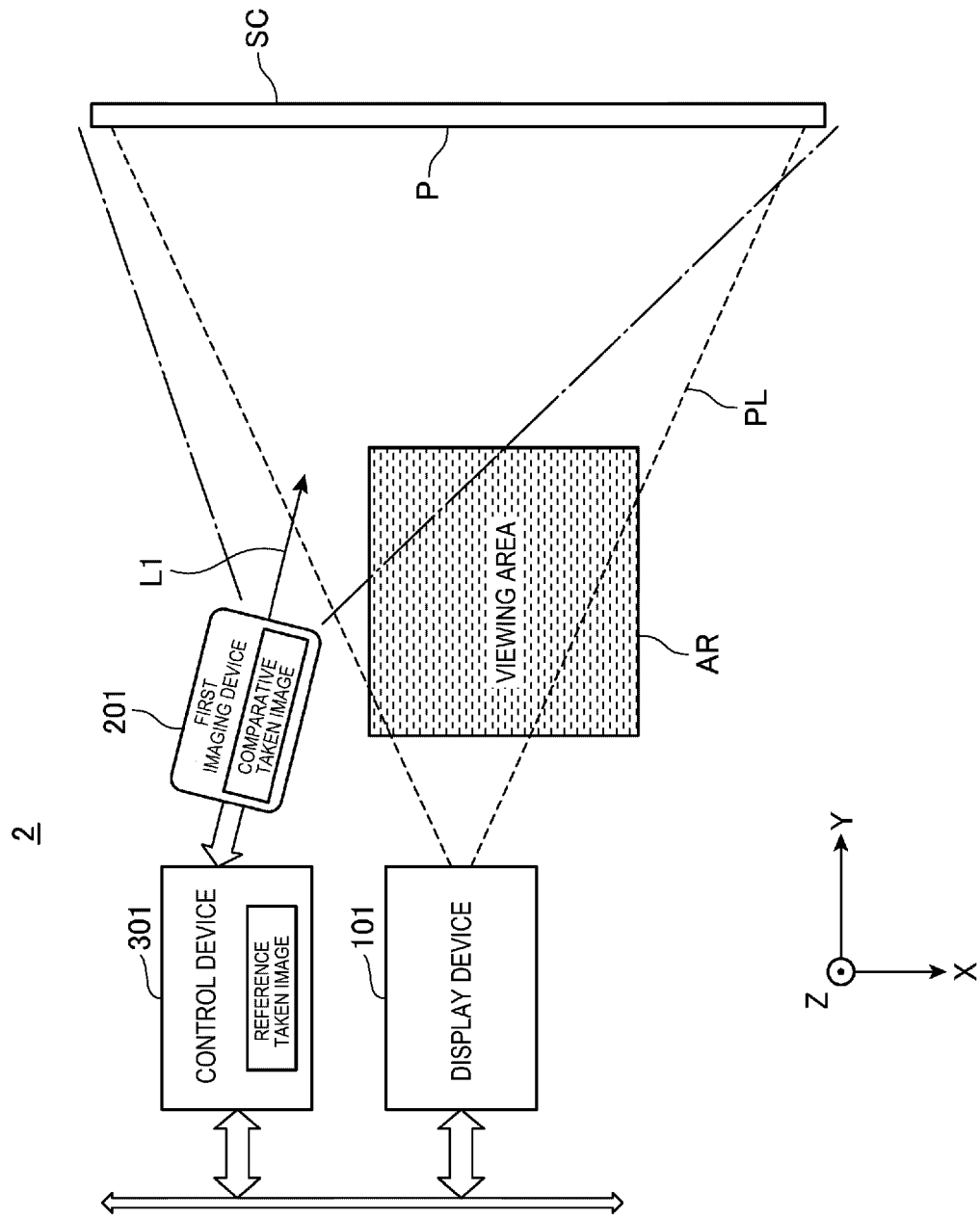
FIG. 8 is a diagram showing an example of a configuration of a display system according to a second embodiment.
Figure 9:
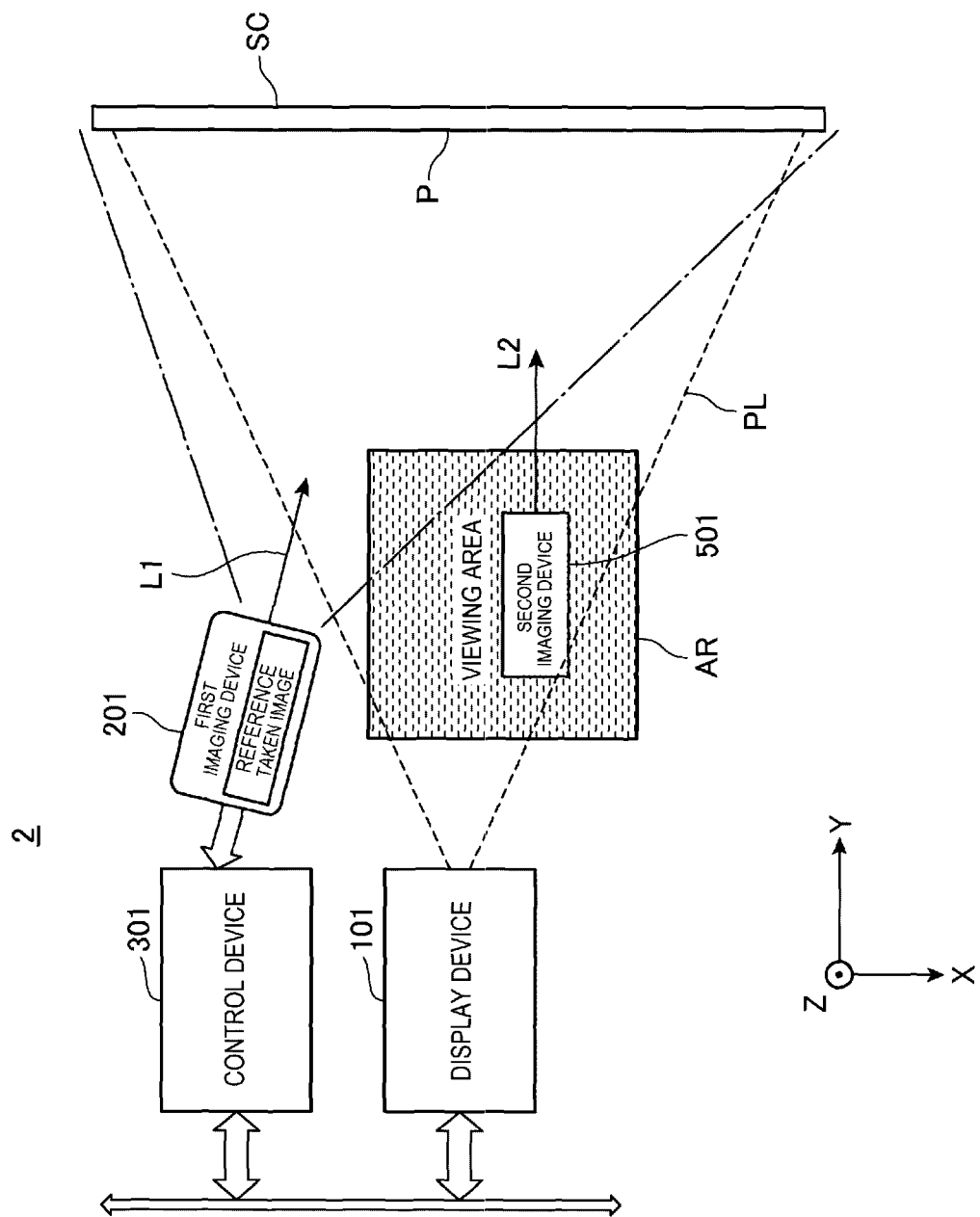
FIG. 9 is a diagram showing an example of the configuration of the display system when performing the initial adjustment process.
Figure 10:
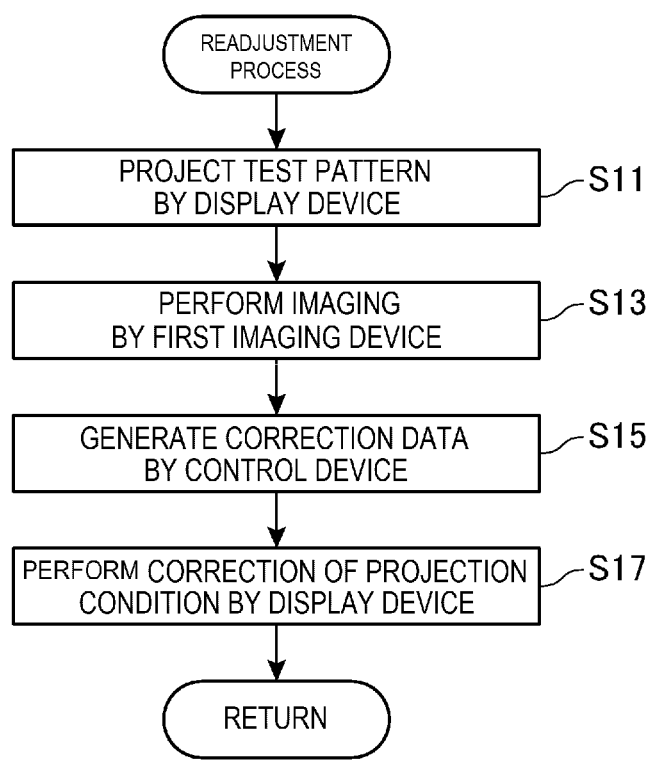
FIG. 10 is a flowchart showing an example of the readjustment process of the display system.

FIG. 8 and FIG. 9 are each a plan view showing a configuration of a display system 2 according to the second embodiment, and FIG. 10 is a flowchart of the readjustment process of the display system 2 according to the second embodiment. When configurations of components in the display system 2 according to the second embodiment are the same as the configurations of the components in the first embodiment, the components are denoted by the same reference symbols, and the detailed description of the components is omitted.

The display system 2 is provided with a display device 101, a first imaging device 201, and a control device 301. The display device 101, the first imaging device 201, and the control device 301 are configured so as to be able to communicate with each other with a network connection, the USB standard, the HMD standard, or the like.

In FIG. 8 and FIG. 9, there are described the X axis, the Y axis, and the Z axis perpendicular to each other. The Z axis represents a vertical direction. The X axis and the Y axis are parallel to a horizontal direction. In FIG. 8 and FIG. 9, the screen SC having the projection surface parallel to the X-Z plane is disposed on a wall in a vertical direction, and the viewing area AR is disposed in an area in front of the screen SC including an area right in front of the screen SC. The viewer stands or sits on a chair or the like in the viewing area AR to visually recognize the projection image P displayed on the screen SC.

FIG. 8 is a diagram schematically showing an example of a configuration when performing the readjustment of the display system 2. When performing the readjustment, the first imaging device 201 takes the projection image P displayed on the screen SC from a first direction L1. The first direction L1 is a direction in which a part of the projection image P necessary for the readjustment can be imaged. For example, the first direction L1 is an optical axis direction of an imaging lens of the first imaging device 201.

FIG. 9 is a diagram schematically showing an example of a configuration when performing the initial adjustment of the display system 2. When performing the initial adjustment, a second imaging device 501 for taking the projection image P displayed on the screen SC from a second direction L2 different from the first direction L1 is installed in the viewing area AR, and the initial adjustment process including the color adjustment of the display device 101 is executed. The second direction L2 is a direction in which the viewer located in the viewing area AR visually recognizes the projection image P displayed on the screen SC. For example, the second direction L2 is an optical axis direction of an imaging lens of the second imaging device 501 installed in the viewing area AR. The installation of the imaging device in the viewing area AR is difficult when performing the readjustment, but is easy when performing the initial adjustment.

The display device 101 receives the image data from the image supply device not shown, and then projects the image light beam PL corresponding to the image data thus received to thereby display the projection image P on the screen SC. The display device 101 is installed so as to be suspended from the ceiling, and projects the image light beam PL on the projection surface of the screen SC from above the viewing area AR.

In the display device 101, the projection condition is adjusted so that the projection image P is displayed in a state desired by the viewer located in the viewing area AR based on the taken image PM imaged by the second imaging device 501 when performing the initial adjustment.

When performing the readjustment, the display device 101 adjusts the projection condition based on the correction data generated by the control device 301. Even when the projection image P has changed from the state desired by the viewer due to a temporal change of the display device 101 or a change in environment, the projection image P is adjusted by the readjustment process so as to be in the state desired by the viewer.

The first imaging device 201 takes an image of an imaging range including the projection image P displayed on the screen SC from the first direction L1 to generate the taken image PM. The imaging device 201 is installed so as to be suspended from the ceiling so that an area including the projection image P displayed on the screen SC becomes the imaging range. The data representing the taken image PM is used when the display device 101 adjusts the color tone and the luminance of the projection image P.

When performing the initial adjustment, the first imaging device 201 takes the projection image P displayed by the display device 101 in the projection condition set to the display device 101 to generate a first taken image PS. The first imaging device 201 transmits the data representing the first taken image PS thus generated to the control device 301. The first taken image PS is a "reference taken image" corresponding to the "reference image" in the first embodiment.

When performing the readjustment of the display device 101, the first imaging device 201 takes the projection image P displayed by the display device 101 to generate a second taken image PC as the taken image PM. The first imaging device 201 transmits the data representing the second taken image PC thus generated to the control device 301. The second taken image PC is a "comparative taken image" corresponding to the "comparative image" in the first embodiment.

The control device 301 is installed so as to be able to communicate with the display device 101 and the imaging device 201. The control device 301 controls the projection by the display device 101 and the imaging by the first imaging device 201.

The control device 301 stores the data of the first taken image PS received from the first imaging device 201.

When performing the readjustment, the control device 301 obtains the data representing the second taken image PC from the first imaging device 201. The control device 301 retrieves the data representing the first taken image PS. The control device 301 generates the correction data DC for correcting the projection condition of the display device 101 based on the first taken image PS and the second taken image PC. The control device 301 transmits the correction data DC thus generated to the display device 101.

The display device 101, the first imaging device 201, and the control device 301 are respectively formed of a projector, a camera, and a computer separated from each other in the present embodiment, but can be provided with a configuration in which the projector 101 is provided with the camera 201 and the computer 301. Further, the projection image P when performing the adjustment is an image corresponding to the test pattern TP.

FIG. 10 is a diagram showing a flow of the readjustment process of the display system 2.

In the step S11, the display device 101 displays the projection image P on the screen SC.

In the step S13, the first imaging device 201 takes the projection image P displayed on the screen SC, generates the second taken image PC, and then transmits the data representing the second taken image PC to the control device 301.

In the step S15, the control device 301 receives the data representing the second taken image PC, and retrieves the data representing the first taken image PS. The control device 301 generates the correction data DC for correcting the projection condition of the display device 101 based on the first taken image PS and the second taken image PC, and then transmits the correction data DC to the display device 101.

In the step S17, the display device 101 adjusts the projection condition based on the correction data DC thus received.

Due to the steps described above, in the display system 2, there is completed the readjustment process of the projection image P for setting the projection image P in the state desired by the viewer even when the projection image P to be displayed on the screen SC changes from the state desired by the viewer due to the temporal change of the display device 101 or the change in environment.

As described hereinabove with reference to FIG. 8 through FIG. 10, the display system. 2 according to the present embodiment is the display system 2 provided with the display device 101, the control device 301, and the first imaging device 201 for imaging the screen SC from the first direction L1, wherein the first imaging device 201 takes the projection image P, which is displayed by the display device 101 on the screen SC in the projection condition set using the second imaging device 501 for imaging the screen SC from the second direction L2 different from the first direction L1, from the first direction L1 to generate the first taken image PS, the control device 301 stores the first taken image PS generated by the first imaging device 201, makes the display device 101 display the projection image P on the screen SC in the projection condition adjusted using the second imaging device 501, makes the first imaging device 201 take the projection image P displayed on the screen SC to generate the second taken image PC, and generates the correction data DC for correcting the projection condition based on the first taken image PS and the second taken image PC, and the display device 101 adjusts the projection condition based on the correction data DC.

Therefore, only by taking the projection image P displayed on the screen SC from the first direction L1 when performing the readjustment, it is possible to easily adjust the projection image P so as to be in the state desired by the viewer located in the viewing area AR. Further, it is possible to adjust the image to be displayed on the screen SC so as to be in the state desired by the viewer who visually recognizes the image displayed on the screen SC from the second direction L2 without installing the second imaging device 501 for taking the projection image P displayed on the screen SC from the second direction L2 in the viewing area AR.

The method of controlling the projector 101 according to the present embodiment is the method of controlling the projector 101 provided with the camera 201 for imaging the screen SC from the first direction L1, makes the camera 201 take the projection image P projected on the screen SC from the first direction in the projection condition set using the taken image PM obtained by imaging the screen SC from the second direction L2 different from the first direction L1 to generate the first taken image PS, then stores the first taken image PS thus generated, then when performing the readjustment, projects the projection image P on the screen SC in the projection condition thus set, makes the camera 201 take the projection image P displayed on the screen SC from the first direction L1 to generate the second taken image PC, and then corrects the projection condition based on the first taken image PS and the second taken image PC.

Therefore, only by using the camera 201 provided to the projector 101 when performing the readjustment, it is possible to easily adjust the projection image P so as to be in the state desired by the viewer located in the viewing area AR.

3. Other Embodiments

The embodiments described above are preferred embodiments. It should be noted that the embodiments described above are not a limitation, but a variety of types of modified implementation are possible within the scope or the spirit of the present disclosure.

In the first embodiment, the display system 1 is provided with the first projector 100A and the second projector 100B, and performs the tiling display in the left-right direction of the first projection image PA and the second projection image PB, but the embodiment of the present disclosure is not limited to this configuration. It is possible for the display system 1 to perform the tiling display in a vertical direction. Further, it is possible to perform the tiling display with three or more projectors 100. Further, it is not required to perform the tiling display with a single projector 100.

The first projector 100A and the second projector 100B are each provided with the first generation section 153, the second generation section 154, the third generation section 155, and the correction section 156 in the first embodiment, but the embodiment of the present disclosure is not limited thereto. It is possible to adopt a configuration in which one of the projectors 100 is used as a master projector and the other is used as a slave projector to be controlled by the master projector. It is possible for the slave projector to be provided with a configuration not provided with some or all of the first generation section 153, the second generation section 154, the third generation section 155, and the correction section 156.

The projection optical device 400 has the U-shaped light path in the first embodiment, but the embodiment of the present disclosure is not limited thereto. The shape of the light path of the projection optical device 400 can be a linear shape or can also be a bent shape. When the light path of the projection optical device 400 is the bent shape, for example, the projection optical device 400 can be provided with an L-shaped light path.

The attachment part 911 for the camera is provided to the projection optical device 400 in the first embodiment, but the embodiment of the present disclosure is not limited thereto. It is sufficient for the attachment part 911 for the camera to be provided to the projector 100.

There is described when the light modulation device 112 is provided with the liquid crystal panels 115 of a transmissive type as the light modulation elements in the present embodiment, but the embodiment of the present disclosure is not limited thereto. The light modulation element can be a reflective liquid crystal panel, or can also be a digital micromirror device (Digital Micromirror Device).

Further, each of the functional sections shown in FIG. 2 is for showing the functional configuration, and the specific implementation configuration is not particularly limited. In other words, it is not necessarily required to install the hardware individually corresponding to each of the functional sections, but it is obviously possible to adopt a configuration of realizing the functions of the plurality of functional sections by a single processor executing a program. Further, a part of the function realized by software in the embodiment described above can also be realized by hardware, or a part of the function realized by hardware can also be realized by software. Besides the above, the specific detailed configuration of each of other sections of each of the projector 100 and the camera 200 can arbitrarily be modified within the scope or the spirit of the present disclosure.

What is claimed is:

1. A method of controlling a display system comprising:
   a first generation step of projecting a test pattern by a first projector in a reference state in which a projection condition of the first projector is adjusted so that a color of a first projection image when viewed from front becomes a desired color, and taking the first projection image corresponding to the test pattern by a first camera to generate a reference image;

a second generation step of projecting the test pattern by the first projector and taking the first projection image corresponding to the test pattern by the first camera to generate a comparative image when performing a readjustment of the color of the first projection image;

a third generation step of generating correction data used to correct the projection condition so that the comparative image coincides with the reference image; and a correction step of correcting the projection condition based on the correction data.

2. The method of controlling the display system according to claim 1, wherein the reference state represents a state obtained after a second camera different from the first camera is disposed in a viewing area representing an area where a user is located when the user visually recognizes the first projection image, and the projection condition of the first projector is adjusted based on a taken image generated by the second camera taking the first projection image.

3. The method of controlling the display system according to claim 2, wherein in the reference state, the second camera is disposed at substantially a central position of the viewing area.

4. The method of controlling the display system according to claim 2, wherein the first camera is disposed outside the viewing area.

5. The method of controlling the display system according to claim 1, wherein the first camera is provided to the first projector.

6. The method of controlling the display system according to claim 5, wherein the first projector includes a bent type projection optical device, and the first camera is disposed in an end portion at a projection side of the bent type projection optical device.

7. The method of controlling the display system according to claim 1, wherein the display system includes a second projector different from the first projector, a second projection image projected by the second projector is subject to tiling display together with the first projection image, and the first projector and the second projector project the test pattern in sequence in each of the first generation step and the second generation step.

8. A display system comprising:

a projector;

a camera which is coupled to the projector so as to communicate with the projector, and which is configured to take a projection image by the projector; and one or more processors programmed to:

make the projector project a test pattern in a reference state in which a projection condition is adjusted so that a color of the projection image when viewed from front becomes a desired color, and make the camera take the projection image corresponding to the test pattern to generate a reference image, make the projector project the test pattern and then make the camera take the projection image corresponding to the test pattern to generate a comparative image when performing a readjustment of the color of the projection image, generate correction data used to correct the projection condition so that the comparative image coincides with the reference image, and correct the projection condition based on the correction data.

9. A method of controlling a projector comprising:

a first generation step of projecting a test pattern in a reference state in which a projection condition of the projector is adjusted so that a color of a projection image when viewed from front becomes a desired color, and making a camera take the projection image corresponding to the test pattern to generate a reference image;

a second generation step of projecting the test pattern and then making the camera take the projection image corresponding to the test pattern to generate a comparative image when performing a readjustment of the color of the projection image;

a third generation step of generating correction data used to correct the projection condition so that the comparative image coincides with the reference image; and a correction step of correcting the projection condition based on the correction data.

* * * * *